March 18, 1958 — F. F. HODGE — 2,827,008
FLOW INDICATOR

Filed Oct. 19, 1955 — 3 Sheets-Sheet 1

INVENTOR.
FRED F. HODGE
BY
Horace B. Van Valkenburgh
ATTORNEY

March 18, 1958     F. F. HODGE     2,827,008
FLOW INDICATOR

Filed Oct. 19, 1955     3 Sheets-Sheet 2

INVENTOR.
FRED F. HODGE
BY
Horace B. Van Valkenburgh
ATTORNEY

March 18, 1958 F. F. HODGE 2,827,008
FLOW INDICATOR

Filed Oct. 19, 1955 3 Sheets-Sheet 3

INVENTOR.
FRED F. HODGE
BY
Horace B. Van Valkenburgh
ATTORNEY

United States Patent Office 2,827,008
Patented Mar. 18, 1958

2,827,008

FLOW INDICATOR

Fred F. Hodge, Longmont, Colo.

Application October 19, 1955, Serial No. 541,333

17 Claims. (Cl. 116—117)

This invention relates to flow indicators and more particularly to flow indicators which are adapted to indicate the presence or absence of a minimum flow of fluid.

Flow indicators are utilized primarily for measuring the amount of flow of fluid, one well known type including a rotatable plug normally having a tapered lower end and spiral grooves or flutes along the side to cause a spinning motion to be imparted to the plug. Such plugs may be considered as floats, i. e., they float in the fluid flowing through a vertical tube in which such a plug or float is installed, the tube normally being transparent and graduated so that the position of the float and the consequent rate of flow may be observed. Such flow indicators are highly useful as measuring instruments, but ordinarily are considerably less accurate for comparatively low rates of flow than for higher rates and also must be carefully and precisely made, thus being in effect precision instruments and therefore relatively expensive. Furthermore, other types of indicators and improvements in the above, including those in which an electronic circuit is associated with a plug or the like, not only for indicating, but also for recording purposes, are quite expensive.

For many purposes, including the indication of whether or not sufficient lubricating oil, for instance, is flowing to a bearing, or in other situations in which the operator needs to be assured that a minimum flow of fluid is taking place, there is need for an indicator which is comparatively sensitive to relatively low flows and can be observed quickly and easily, to determine whether or not a desired minimum flow is present, such minimum flow being lower and usually considerably lower than the normal rate of flow. Thus, it is an object of the present invention to provide a flow indicator which can be used for such purposes.

Additional objects of this invention are to provide such an indicator which may be made in different forms, some of which may be placed in a vertical conduit in which the flow takes place upwardly and others of which may be placed in almost any desired position; to provide each such flow indicator which is simple in construction and may be made at a relatively low cost; and to provide each such flow indicator which is reliable in operation.

Additional objects and the novel features of this invention will become apparent from the description which follows, taken in connection with the accompanying drawings, in which.

Figure 1:
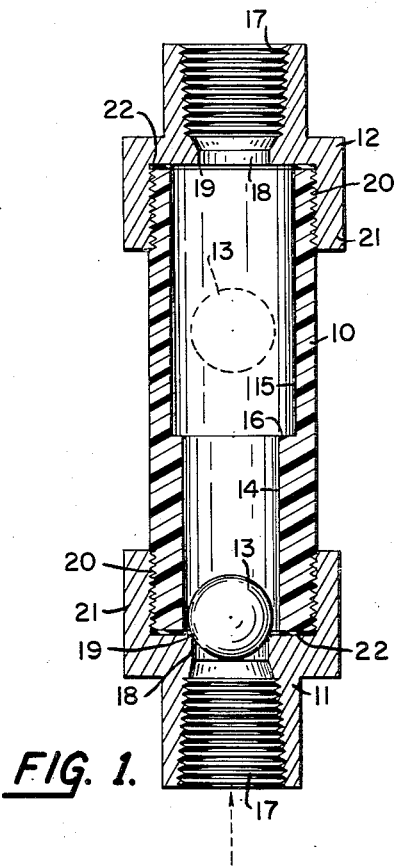
Fig. 1 is a longitudinal section of a flow indicator constructed in accordance with this invention and constituting one embodiment thereof.

As illustrated in Fig. 1, a flow indicator which is especially adapted to indicate a minimum rate of flow, which is normally considerably lower than the usual rate of flow, may include a tube mounted between a fitting 11 at one end and a conveniently similar fitting 12 at the opposite end to form a housing provided with a passage therethrough for the flow of fluid, such as lubricating oil. The flow of fluid is in the direction of the dotted arrow of Fig. 1, i. e., from the lower fitting 11 through the tube 10 and thence out the upper fitting 12, it being noted that the indicator of Fig. 1 is preferably placed in a vertical position and in a conduit or the like in which flow takes place upwardly. The tube 10 is preferably formed of a suitable transparent material, such as plastic, glass, or the like, so that by placing a light behind the tube, the position of a movable flow restrictor, such as a ball 13, may be observed. In accordance with this invention, tube 10 may be provided with a lower passage portion 14 of smaller diameter and an upper passage portion 15 of a larger diameter, the diameter of portion 14 being only slightly greater than the ball 13 so that when a small amount of flow takes place, as in the direction of the dotted arrow of Fig. 1, the ball 13 will be moved upwardly from the lower to the upper end of passage portion 14 relatively quickly upon a slight increase in flow. However, as the ball enters the larger diameter portion 14, any increase in rate of flow, due to the face that there is considerably more space around the ball for the fluid to pass, will not tend to move the ball upwardly to any considerable extent, but rather will tend to cause the ball merely to bobble around in the larger diameter portion 15, such as at and adjacent the dotted position of Fig. 1.

Between the passage portions 14 and 15, tube 10 is preferably provided with a shoulder 16 which is preferably a right angle shoulder, rather than a conical shoulder, as it has been found that a right angle shoulder appears to enhance the facility with which the ball 13 will move from the smaller passage portion 14 into the larger passage portion 15. In other words, these appears to be a more definite break, as it were, between a position of slightly less than minimum flow and a position of minimum flow or greater, by utilization of the right angle shoulder. Also, the ball 13 may be formed of any suitable material, although it has been found that a plastic ball produces less chatter and noise than a steel ball, for instance. Furthermore, the relationship between the diameter of ball 13 and the diameter of its seat 19 and passage 18 should be such that initial flow does not impel ball 13 from its seat and directly into the opening 18 in the upper fitting 12 and obstruct further flow. For instance, with a 9/16 in. ball and a seat only 7/16 in. in diameter, such impelling or "jet" action tended to be produced. However, by enlarging the passage 18 and seat 19 to a diameter of ½ in., this difficulty was overcome. Also, the relationship between the diameter of the ball and the larger, upper passage portion 15 appears to determine the amount of movement of the ball therein. Thus, when the passage portion 15 is greater in diameter, compared with the same ball diameter, the ball does not tend to move around quite as much as when the diameter of portion 15 is lessened. It will be understood, of course, that the diameter of passage portion 15 is always greater than the diameter of passage portion 14, which in turn is slightly greater than the diameter of the ball.

With a light placed behind the transparent tube 10, the operator can readily observe the position of the ball and particularly whether or not the ball has moved upwardly in the smaller diameter portion 14 or entered the larger diameter portion 15. Therefore, the operator can readily determine whether or not the desired minimum flow is taking place. Generally, such a minimum flow need not be determined with a high degree of accuracy so that the diameter of the smaller passage portion 14 need not be made with any greater degree of precision than is possible in normal plastic molding machines. Of course, tube 10 may be made from an extruded tube with the larger diameter portion 15 machined from the inside, but such machining need not be highly accurate since considerable variation in the diameter of the larger passage portion 15 is possible without unduly affecting the movement of ball 13 while in this passage portion.

In order to prevent ball 13 from dropping out of the tube 10 and also to provide a seal to prevent reverse flow when the same is desired, the passage through lower fitting 11, which may be provided with threads 17 for attachment of a pipe or the like, may be provided with a constriction 18 and also be provided with a seat 19 for the ball 13. The seat 19 may be machined, either as a bevel or merely as the edge of constriction 18. The upper fitting 12 may be made in a similar manner, i. e., provided with threads 17 and a constriction 18, as well as a seat 19, so that the same fitting may be used at either end and all fittings may be made in the same manner.

To attach tube 10 to the fittings 11 and 12, the opposite ends of tube 10 may be provided with threads 20 and each of the fittings provided with an outer, longitudinally extending flange 21 provided with cooperating threads. If desired, a gasket 22 may be interposed between each end of tube 10 and the corresponding fitting, although when the tube 10 is made of plastic and the fittings 11 and 12 made of metal, a sufficiently tight seal may be formed by the engagement of the threads. The fittings 11 and 12 may be made of plastic or other suitable material, such as brass, steel or other metal, such as suitable for die casting.

Figure 3:
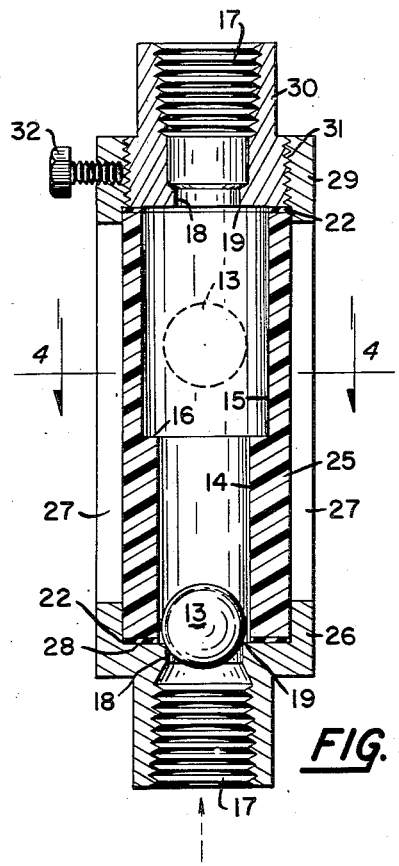
Fig. 3 is a longitudinal section of a flow indicator constituting an alternative embodiment of this invention.
Figure 2:
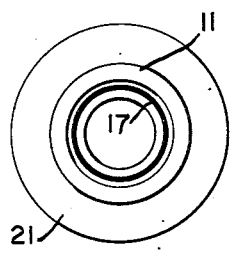
Fig. 2 is a bottom plan view of the flow indicator of Fig. 1.
Figure 4:
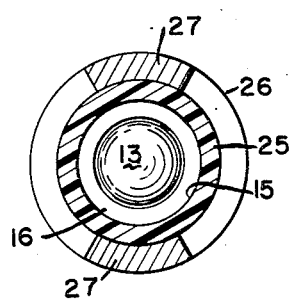
Fig. 4 is a cross section taken along line 4—4 of Fig. 3.

In the embodiment of this invention illustrated in Figs. 3 and 4, the operation of the flow indicator is quite similar, i. e., the indicator is preferably placed in an upright line in which the fluid flows upwardly, the direction of flow thus being in the direction of the dotted arrow of Fig. 3. A tube 25, again preferably formed of a suitable transparent material, such as plastic, glass or the like, is provided with a lower smaller diameter passage portion 14 and an upper large diameter passage portion 15 with a shoulder 16 therebetween, in a manner similar to the tube 10 of Fig. 1. The movement of ball 13 through the smaller passage portion 14, upon a slight increase in flow, is again similar, while the movement of the ball in the larger portion 15, such as merely bobbling around upon increases in flow beyond or considerably beyond the minimum flow, is again similar to that previously described.

The tube 25 may be clamped between a fitting 26 provided with two or more radially spaced ribs 27 extending longitudinally so that the position of the ball 13 may be observed through the space between the ribs 27 and also so that a light may be placed behind the tube and will shine through the opposite space between the ribs. The fitting 26 may be provided with a shoulder 28 against which the lower end of tube 25 rests, a gasket 22 preferably being provided to insure an adequate seal. At its opposite end, fitting 26 may be provided with an interiorly threaded ring 29 into which a fitting 30 may be threaded by cooperating threads 31 so as to clamp tube 25 between fitting 30 and shoulder 28 of fitting 26. Again, a gasket 22 may be inserted at this end of tube 25 for sealing purposes, while fitting 30 may be held in fixed position relative to ring 29 by a cap screw 32, or any other suitable manner may be utilized.

The passage through each of the fittings 26 and 31 may be similar and also similar to the passage through the fittings 11 and 12 of Fig. 1. Thus, each of the fittings 26 and 30 may be provided with threads 17 for attachment to a pipe or other type of conduit and a constriction 18 provided with a seat 19 at its inner end, respectively, to prevent the ball 13 from dropping out and to enable the indicator to be used to prevent return flow of fluid. The seat 19 may, of course, be merely the edge of constriction 18, as indicated previously. It will be understood that the position of tube 25 in the fittings 26 and 30 may be reversed, i. e., the lower end of tube 25 may be placed against fitting 30 and the position of the fittings shown in Fig. 3 reversed. Fittings 26 and 30, as before, may be cast from metal, such as brass or other metal, or may be molded from a suitable plastic, with machining of surfaces which require the same.

Figure 5:
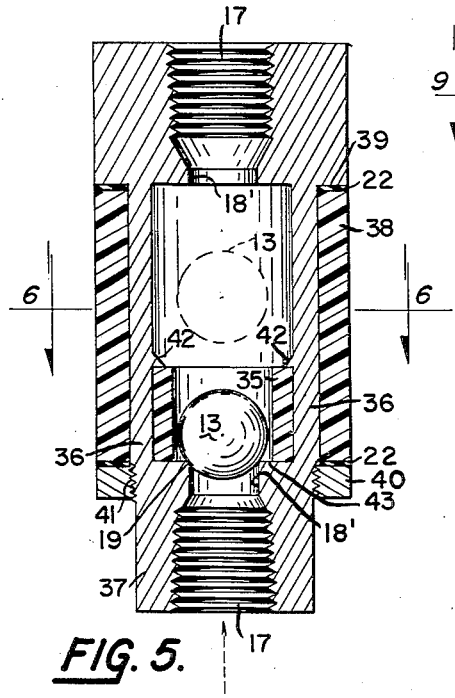
Fig. 5 is a longitudinal section of a still further alternative embodiment of the invention.
Figure 6:
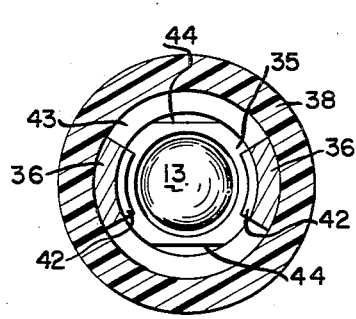
Fig. 6 is a cross section taken along line 6—6 of Fig. 5.
Figure 9:
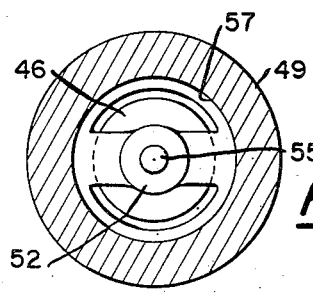

In the further alternative embodiment of this invention illustrated in Figs. 5 and 6, the action of the ball 13 is generally similar to the action of ball 13 of the embodiments previously described. However, a smaller diameter passage portion may be provided by a short tube 35, preferably transparent and conveniently made of plastic, although other materials, such as glass, might be utilized. A passage portion of a larger diameter may be provided between ribs 36 of a fitting 37 and the inside of a tube 38, the ribs 36 being enclosed by tube 38 which is formed of transparent material, such as plastic. The upper end of tube 38 abuts against an upper shoulder 39 of fitting 37, with a gasket 22 preferably interposed for sealing purposes, with the lower end of the tube 38 being clamped by an interiorly threaded ring nut 40 adapted to engage threads 41 provided in a suitable position on the outside of fitting 37 adjacent the lower end thereof, with a gasket 22 again being interposed for sealing purposes.

As before, a light placed behind the indicator will enable the position of the ball 13 to be observed readily through the space between the ribs 36. When the ball rises to the upper dotted position, it may move to one side or to the other to contact either of the ribs 36 or the inside of tube 38, but when the flow ceases or drops below the minimum, the ball will fall back down into the short tube 35. Short tube 35 could be made integral with the fitting 37, but the latter is preferably formed of metal and therefore tube 35 would not be transparent if formed of metal. Tube 35 may, of course, be formed in place, as by molding, but this could be relatively difficult and expensive, or tube 35 could be held in position by set screws extending through ribs 36. However, it is convenient to hold the tube 35 in position by lugs 42 which extend inwardly from each of the ribs 36. The length of tube 35 is preferably such that it will seat fairly snugly between the lugs 42 and a shoulder 43 on which the lower end of the tube 35 rests. To facilitate insertion of the tube 35 within the fitting, it may be provided with two flat sides 44, as in Fig. 6, the distance between the sides 44 being only slightly less than the shortest distance between ribs 36, so that the tube 35 may be slipped between ribs 36 in a position axially perpendicular to that shown in Fig. 6 and the tube then turned to the position of Fig. 6. As will be evident, the lugs 42 prevent tube 35 from being displaced upwardly, while the arcuate sides of tube 35, between the flats 44, correspond to the diameter of the inner surface of ribs 36 below lugs 43 and prevent lateral displacement. Thus, when the tube 35 is once placed in position, it can be removed only by twisting until the flat sides 44 permit the tube to be slid out laterally. If desired, the configuration of the inside of the ribs 36 below lugs 42 may be other than circular so as to engage a correspondingly shaped side of the tube 35.

The fitting 37 may be made in one piece, as by casting, and at each end may be provided with threads 17 for attachment to a pipe or other type of conduit with a constriction 18 or 18' inwardly from threads 17 to prevent ball 13 from falling out either end. A seat 19 may be formed at the lower constriction 18, as previously described, while upper constriction 18' need not be provided with a seat. For assembly, the tube 35 may be placed in position, then the ball 13 slipped into position, the shortest distance between the ribs 36 being, of course, greater than the diameter of ball 13, so that the ball 13 may be slipped between the ribs. Then, the outer tube 38 and gaskets 22 may be placed in position and ring nut 40 tightened.

Figure 7:
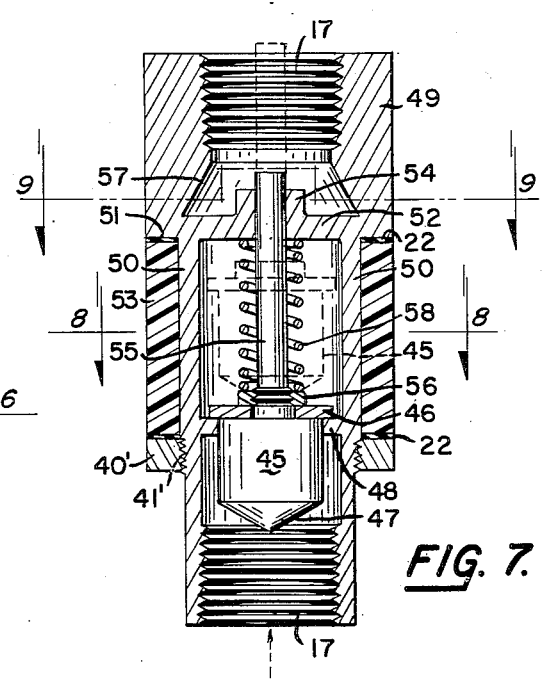
Fig. 7 is a longitudinal section of a flow indicator which is a further alternative embodiment of this invention.
Figure 8:
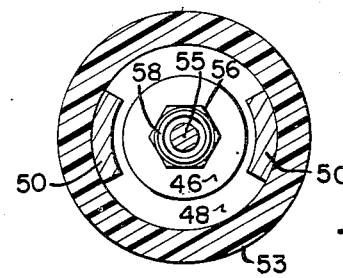
Fig. 8 and Fig. 9 are each a cross section taken along the respective line 8—8 and 9—9 of Fig. 7.
Figure 10:
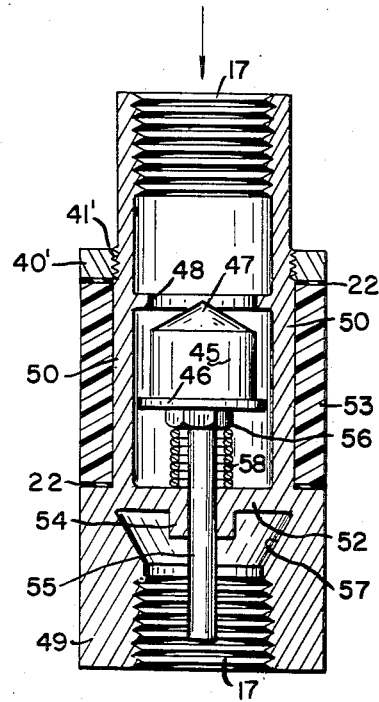
Fig. 10 is a longitudinal section of the indicator of Fig. 7 in a different position.

In the embodiment of this invention illustrated in Figs. 7 to 10, inclusive, the flow indicator is adapted to be placed in an upright line with the flow upwardly, as in the direction of the dotted arrow of Fig. 7, or in a reverse position, i. e., in a line in which the flow of fluid is downward, as in the direction of the arrow of Fig. 10. In the previous embodiments, which involved a ball as the restrictor in the passage through the housing, the passage in the housing provided a flow constriction of lesser cross sectional area between an initial position of the restrictor and a position spaced therefrom in the direction of fluid flow, as well as a greater cross sectional area at positions of the restrictor beyond such spaced position. However, the restrictor itself or the restrictor and passage in combination may provide these cross sectional areas. Thus, in the embodiment of Fig. 7, a plug 45 is preferably generally cylindrical between a seating member, such as a disc 46, and the opposite end thereof, which may be formed as a conical point 47. The diameter of plug 45 is preferably slightly less than the inner diameter of an inwardly extending flange 48 of a fitting 49, while the diameter of disc 46 is greater than that of the plug 45 and sufficient to adequately engage the side of flange 48. At its opposite ends, fitting 49 may be provided with threads 17 for attachment of a pipe or similar type of conduit, while on the opposite side of flange 48, longitudinal ribs 50 may extend to the position of an exterior shoulder 51 and a centrally disposed, transverse rib 52. Shoulder 51 is engaged by one end of a transparent tube 53 with a gasket 22 interposed for sealing purposes, while the opposite end of tube 53 may be clamped by a ring nut 40' and cooperating threads 41' on fitting 49, with a gasket 22 interposed between the tube and ring nut. Transverse rib 52 may be provided with a boss 54 at the center and an axial hole extending therethrough to receive a stem 55 which maintains plug 45 in axial position during movement between the closed or full position and the various open positions, including the dotted position of Fig. 7. Stem 55 may be formed integrally with plug 45, or may be attached thereto as by threading, and in turn may be provided with threads adjacent plug 45 to cooperate with a nut 56 in clamping disc 46 to the plug. In addition, a diverging passage portion 57, which extends outwardly toward the transverse rib to minimize the flow restricting effect of this rib, may be provided. As will be evident, between the plug flange 48 and transverse rib 52, the cross sectional area available for fluid flow, except for that occupied by the plug 45 and disc 46, comprises the area within the tube 53 except for that occupied by the longitudinal ribs 50, as will be evident from Fig. 8.

Resilient means, such as a coil spring 58, may be utilized to urge the restrictor, such as plug 45, to the closed position, the coil spring 58 conveniently acting between the transverse rib 52 and disc 46 or nut 56, as shown. Of course, other types of resilient means, such as a tension spring connected to the opposite end of the plug, may be utilized. Although when the indicator is in the position of Fig. 7 and the fluid flow is upwardly, there is less need for the spring 58, since the plug 45 tends to be held downwardly and also to be returned to a seating position by gravity, in order to enable the indicator to be used in reverse position, i. e., as in Fig. 10, the spring 58 will move the plug to closed position and against the force of gravity. Nevertheless, even with the flow of fluid upwardly, as in Fig. 7, the spring does tend to hold the stem and plug more accurately in longitudinal alignment.

For assembly, disc 46 may be slipped edgewise between ribs 50 and then placed on flange 48. Then, stem 55 may be started up through flange 48, and nut 46 and one end of spring 58 slipped thereover, so that stem 55 can be moved into the hole therefor in rib 52. As soon as plug 45 reaches disc 46, nut 56 can be tightened. Then, tube 53 may be installed on the outside of fitting 49.

As will be evident, with the indicator in the upright position of Fig. 7, or the reverse position of Fig. 10, when flow of fluid in the direction of the respective arrow first takes place, the fluid will enter the relatively small area between the plug 45 and flange 48 and by pressure against disc 46 will push the plug in the direction of fluid flow, i. e., from the full position of Fig. 7 toward the dotted position thereof, or toward the full position of Fig. 10. As the rate of flow begins to increase, the plug will be pushed further for a relatively greater increment of distance for each increment of increase in fluid flow, than after the plug leaves flange 48. When the conical point 47 begins to enter the flange 48, the cross sectional area between the plug and the flange will rapidly increase for small increments of upward movement of the plug, so that a substantial increase in flow at this time will move the plug only a relatively small amount, such as to the dotted position of Fig. 7. A further increase in flow will merely cause the plug to compress spring 58 further, while the maximum movement of the plug 45 is the position at which spring 58 is completely compressed, as in Fig. 10. As will further be evident, during the comparatively large amount of movement of the plug for a relatively small increase in flow, while the plug is still within the flange 48, significant changes in the position of the plug can be observed readily. Also, the operator can readily determine whether the conical point of the plug has entered or left a position within the flange 48. Thus, with a light behind the indicator, the plug will be visible for a considerable distance, viewed between the ribs 50, so that the operator can readily ascertain whether the plug is in a position indicating that the predetermined minimum of flow has been reached. Of course, the indicator may be calibrated for a minimum rate of flow at any desired position, although as long as the disc 46 has with certainty left the flange 48, there is some flow taking place.

Figure 11:
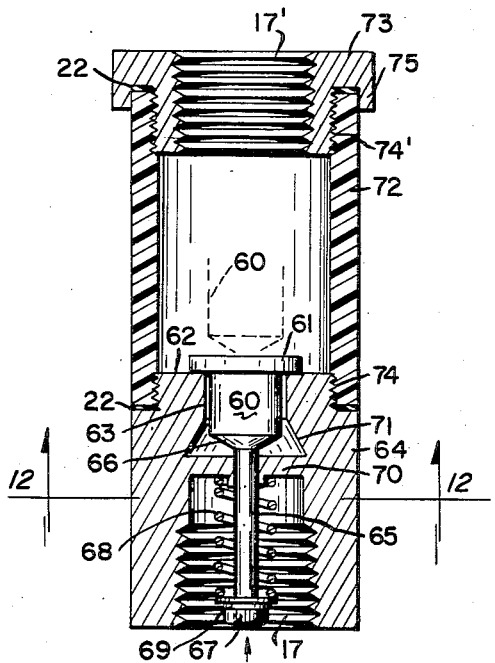
Fig. 11 is a longitudinal section of a still further embodiment of this invention.
Figure 12:
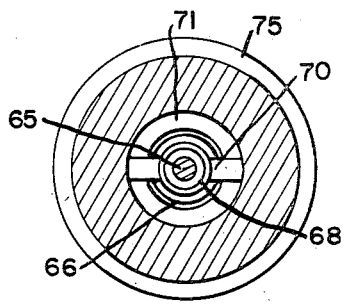
Fig. 12 is a cross section taken along line 12—12 of Fig. 11.

In the further embodiment of this invention illustrated in Figs. 11 and 12, a plug 60 is provided with a flange 61 at one end, adapted to seat against a shoulder 62 formed at the inner end of a restricted passage 63 in a lower fitting 64. At its opposite end, plug 60 may be provided with a stem 65 and a conical shoulder 66 therebetween, the stem 65 conveniently being integral with plug 60, although either the stem 65 or the flange 61, or both, may be made separately and attached to the plug. The plug 60 may be formed of plastic, in which case flange 61 and stem 65 may be formed integrally therewith, as by molding. Or, plug 60 may be formed of metal, such as a light metal such as aluminum or magnesium or alloy thereof, and may be machined from bar or round stock or may be die cast or formed in any other suitable manner. Stem 65 may be threaded at its outer end to receive a nut 67 to provide an abutment for one end of a coil spring 68, as by a metal washer 69, although any other suitable manner of providing a bearing surface for the end of spring 68 may be utilized. The opposite end of spring 68 bears against a transverse rib 70 provided with a hole in the center through which stem 65 moves and conveniently reinforced by a boss which may also be surrounded by spring 68. Fitting 64 may also be provided with a diverging passage portion 71 between the restricted passage portion 63 and the transverse rib 70 to prevent undue restriction of flow by the rib, as well as with threads 17 for attachment of a pipe or other type of conduit. A transparent tube 72, preferably formed of plastic but conveniently formed of glass or other suitable material, extends between the lower fitting 64 and an upper fitting 73, tube 72 conveniently being provided with interior threads and the respective fittings with exterior threads 74 and 74', for attachment of tube 72 thereto, with a gasket 22 being interposed at each end of the tube for sealing purposes, if desired. Fitting 73 may also be provided with interior threads 17' for attachment of a pipe or the like. Also, if desired, upper fitting 73 may be provided with an exterior flange 75 which encloses the upper end of tube 72 and permits flat or hexagonal sides to be produced on the fitting 73 more readily, it being understood, of course, that flange 75 may be omitted and that the outer diameter of fitting 73 may be the same as that of fitting 64.

As will be evident, when flow begins in the direction of the dotted arrow of Fig. 11, the fluid will move upwardly past the transverse rib 70 and into the small cross sectional area around the plug 60 to engage the plug flange 61 and lift the plug against the pressure of spring 68. As flow increases, the plug will be moved further in passage portion 63 and into the space within tube 72 until shoulder 66 between plug 60 and its stem 65 reaches the end of passage 63, after which movement of the plug for each increase in increment of flow will be considerably less, as until the plug reaches the dotted position of Fig. 11. As will further be evident, by placing a light behind the indicator, the operator will be able to see from some distance whether or not the plug 60 has moved upwardly any appreciable amount, so as to determine whether the desired minimum flow is taking place. As long as the flow is greater than the flow which will move the plug past the fitting shoulder 62, the position of the plug may vary slightly for increases and decreases in flow, but will not tend to appreciably vary. However, if the flow should decrease, the plug will move back down into the restricted passage 63 until with cessation of flow, flange 61 will again seat on the shoulder 62. As will be evident, tube 72 permits light to be shown through the tube from any position and the position of the plug also to be viewed from any position, so that there is no necessity of aligning the light and a space between ribs, for instance. As will further be evident, the indicator of Fig. 11 may be turned upside down so as to indicate whether or not a predetermined minimum flow is taking place in a line in which the flow of fluid is downwardly, such as in the case of the flow indicator of Fig. 7 when placed in the position of Fig. 10.

An indicator constructed in accordance with any of the embodiments of this invention may be made readily and economically. As pointed out, any of the fittings described may be formed by casting, although the same may be formed by machining, if desired. Any of the transparent tubes, when made of plastic, may be individually molded or may be formed from sections of extruded tubing cut to length, with threads machined therein when necessary. While the threads which connect the fittings with pipe or similar conduit are preferably pipe threads, i. e., tapered threads, machine threads are preferably utilized for connecting a plastic tube to a metal fitting. Due to the fact that tapered threads, such as pipe threads, tend to produce considerable stress on a threaded object when the threads are tightened, but machine threads do not produce the same type of stress, the latter are preferably utilized to minimize the possibility of cracking or damaging a plastic tube in the event the threads are tightened more than necesssary.

It will be evident that, in the embodiment of Figs. 1–6, the ball 13 forms a restrictor and the passage in the housing provides flow constrictions of lesser and greater cross sectional area, with the delineation between the two being relatively sharp, such as provided by shoulder 16 of Figs. 1 and 3 and the top of tube 35 of Fig. 5. Similarly, in the embodiments of Figs. 7–12, the plugs 45 and 60 each form a restrictor and the passage in the housing again forms flow constrictions of lesser and greater cross sectional area, with the delineation between the two being relatively sharp, as at the plug engaging surface of the flange 48 of Figs. 7 and 10 and the shoulder 62 of Fig. 11.

From the foregoing, it will be evident that a flow indicator constructed in accordance with this invention fulfills to a marked degree the requirements and objects hereinbefore set forth. Although certain variations and changes have been indicated, it will be understood that other variations and changes may be made and that the invention may be embodied in forms other than those described, all without departing from the spirit and scope thereof.

What is claimed is:

1. A flow indicator comprising a housing having a passage therethrough and a fluid inlet and outlet connected with opposite ends of said passage; a restrictor in said passage and movable to different positions in said passage by different rates of flow of fluid therethrough, at least one of said restrictor and said passage forming a flow constriction of lesser cross-sectional area between an initial position of said restrictor and a position spaced therefrom in the direction of fluid flow and of greater cross-sectional area at positions of said restrictor beyond said spaced position in the direction of fluid flow, the delineation between said flow constrictions of lesser and greater cross-sectional area being relatively sharp.

2. A flow indicator as defined in claim 1, wherein said passage has portions of lesser and greater cross-sectional area.

3. A flow indicator as defined in claim 1, wherein said restrictor has portions of greater and lesser cross-sectional area.

4. A flow indicator as defined in claim 1, wherein said housing is transparent sufficiently to permit movement and positions of said restrictor to be observed.

5. A flow indicator as defined in claim 4, wherein said housing is formed at least in part of transparent plastic.

6. A flow indicator as defined in claim 5, wherein said housing includes metal fittings attached to opposite ends of said plastic part.

7. A flow indicator as defined in claim 5, wherein said housing includes metal ends and longitudinal ribs extending between said ends.

8. A flow indicator comprising a housing having a passage therethrough and a fluid inlet and outlet connected with opposite ends of said passage; a restrictor in said passage and movable to different positions in said passage by different rates of flow of fluid therethrough, said housing being provided with a seat for said restrictor and at least one of said restrictor and said passage forming a flow constriction of lesser cross-sectional area between an initial position of said restrictor and a position spaced therefrom in the direction of fluid flow, and also flow constrictions of greater cross-sectional area at positions of said restrictor beyond said spaced position in the direction of fluid flow, the delineation between said flow constrictions of lesser and greater cross-sectional area being relatively sharp.

9. A flow indicator as defined in claim 8, wherein said restrictor comprises a ball.

10. A flow indicator as defined in claim 8, wherein a plug having a seating flange is utilized.

11. A flow indicator as defined in claim 8; and a spring urging said restrictor toward said seat.

12. A flow indicator comprising the combination of a housing having a passage therethrough and a fluid inlet and outlet connected with oposite ends of said passage; a restrictor in said passage and movable to different positions in said passage by different rates of flow of fluid therethrough; and means constructed and arranged to cause said restrictor to be moved during its initial movement and for a predetermined distance a greater increment of distance for corresponding increments in increase of fluid flow than the increments of distance said restrictor is moved by similar increments of increase in fluid flow beyond said predetermined distance.

13. A flow indicator comprising a cylindrical transparent tube having a passage therethrough having portions of lesser and greater cross-sectional area with a right angle shoulder therebtween; a fluid inlet fixture and outlet fixture connected to opposite ends of said tube; each said fixture having threads for connection to a pipe and the like and a threaded flange for attachment to the respective end of said tube, said tube ends being threaded to engage said flange threads; and a ball in said tube, said inlet fixture and outlet fixture each having a constriction smaller than said ball and at least said inlet fixture having a seat for said ball at the inner end of said constriction and said ball engaging said seat in the absence of fluid flow, said ball being movable to different positions in said tube by different rates of flow of fluid therethrough, said tube passage forming a flow constriction of lesser cross-sectional area at the initial position of said ball against said seat and of greater cross-sectional area at positions of said ball within said tube portion of greater cross-sectional area.

14. A flow indicator comprising a transparent tube having a passage therethrough having portions of lesser and greater cross-sectional area with a right angle shoulder therebetween; a fluid inlet fixture and outlet fixture clamping opposite ends of said tube therebetween, each said fixture having threads for connection to a pipe and said outlet fixture having exterior threads for attachment to said inlet fixture, said inlet fixture having a shoulder for clamping the end of said tube and circumferentially spaced, longitudinal ribs extending from said shoulder and outside said tube to an interiorly threaded ring which threadedly engages said outlet fixture; a set screw extending through said ring for securing said ring and outlet fixture in fixed threaded engagement; a gasket interposed between each end of said tube and the respective outlet fixture and inlet fixture shoulder; and a ball in said tube, said inlet fixture and outlet fixture each having a constriction smaller than said ball and at least said inlet fixture having a seat for said ball at the inner end of said constriction and said ball engaging said seat in the absence of fluid flow, said ball being movable to different positions in said tube by different rates of flow of fluid therethrough, said tube passage forming a flow constriction of lesser cross-sectional area at the initial position of said ball against said seat and of greater cross-sectional area at positions of said ball within said tube portion of greater cross-sectional area.

15. A flow indicator comprising a metal fixture having a longitudinal passage at each end which is threaded for attachment to a pipe and the like and which is provided with an inner cylindrical constriction and a seat at the inner end of at least one said constriction, said fixture having an inner shoulder and exterior threads adjacent said seat and an exterior shoulder adjacent the opposite constriction, said fixture also having a pair of oppositely disposed, circumferentially spaced longitudinal ribs extending between said inner shoulder and said exterior shoulder, each said rib being transversely arcuate on both the inside and outside and provided with an inwardly extending transverse lug spaced from said inner shoulder; a cylindrical transparent tube having flat sides permitting said tube to pass between said ribs and turned radially to a position within said ribs and between said inner shoulder and said lugs; a transparent cylindrical outer tube surrounding said ribs; a ring nut threadedly engaging said exterior threads for clamping said outer tube against said exterior shoulder; a gasket interposed between each end of said outer tube and the respective ring nut and exterior shoulder; and a ball within said fitting and adapted to engage said seat in the absence of fluid flow, said ball having a diameter slightly less than the inner diameter of said inner tube and the least transverse distance between said ribs being sufficiently greater than said constriction that said ball will pass between said ribs.

16. A flow indicator comprising a metal fixture having an inlet end and an outlet end, each having a fluid passage therethrough and threads for attachment to a pipe and the like, with a pair of circumferentially spaced, longitudinal ribs connecting said inlet end and outlet end, said inlet end having an inwardly extending annular flange and exterior threads at the inner end thereof, and said outlet end having at its inner end an exterior shoulder and a transverse rib having a central hole therethrough, with a passage portion flaring laterally outwardly to said rib; a cylindrical plug having a diameter slightly less than said annular flange and provided at one end with a conical tapering point and at the opposite end with an axial stem extending through said rib hole and threaded at the inner end thereof; an annular disc extending laterally from the stem end of said plug adapted to seat against said annular flange; a nut on said stem and clamping said disc; a coil spring surrounding said stem and bearing between said rib and said disc; a transparent cylindrical tube surrounding said ribs; a ring nut threadedly engaging said exterior threads and clamping said tube against said exterior shoulder; and a gasket between each end of said tube and the respective shoulder and ring nut.

17. A flow indicator comprising a cylindrical transparent tube exteriorly threaded at opposite ends thereof; an inlet fixture and an outlet fixture each having a fluid passage therethrough and connected to opposite ends of said tube, said inlet fixture having an exteriorly threaded, inner shoulder and said outlet fixture having an exteriorly threaded, depending flange for connection with said tube threads and said inlet and outlet fixture each having threads for attachment to a pipe and the like; said inlet fixture having a cylindrical passage portion of restricted diameter adjacent said shoulder, a transverse rib having a central hole therethrough spaced from said restricted passage portion and a passage portion flaring laterally outwardly from said restricted passage portion to said rib; a cylindrical plug having a diameter slightly less than said restricted passage portion and provided at one end with a laterally extending flange adapted to seat against said shoulder and at the opposite end with an axial stem extending through said rib hole and threaded at the extreme end thereof, said plug also having a conical tapering portion at the inner end of said stem; a nut and a spring engaging washer on the extreme end of said stem; and a coil spring surrounding said stem and bearing between said rib and said washer.

References Cited in the file of this patent

UNITED STATES PATENTS

| | | |
|---|---|---|
| 1,889,705 | Sherwood | Nov. 29, 1932 |
| 2,137,102 | Terrell | Nov. 15, 1938 |
| 2,359,467 | Davis | Oct. 2, 1944 |
| 2,607,225 | Biscoe | Aug. 19, 1952 |
| 2,618,974 | Gilbert | Nov. 25, 1952 |